United States Patent [19]
Kiuchi et al.

[11] Patent Number: 4,958,276
[45] Date of Patent: Sep. 18, 1990

[54] SINGLE CHIP PROCESSOR

[75] Inventors: Atsushi Kiuchi, Kunitachi; Kenji Kaneko, Sagamihara; Jun Ishida; Tetsuya Nakagawa, both of Koganei; Yoshimune Hagiwara, Hachioji; Takashi Akazawa, Musashimurayama; Tomoru Sato, Kodaira, all of Japan

[73] Assignees: Hitachi, Ltd.; Hitachi VLSI Engineering Corporation, both of Tokyo, Japan

[21] Appl. No.: 128,585

[22] Filed: Dec. 4, 1987

[30] Foreign Application Priority Data

Dec. 12, 1986 [JP] Japan .................. 61-297036

[51] Int. Cl.$^5$ .............................. G06F 5/06
[52] U.S. Cl. .................. 364/200; 364/232.8; 364/243.2; 364/270.2; 364/271.6
[58] Field of Search ... 364/200 MS File, 900 MS File

[56] References Cited

U.S. PATENT DOCUMENTS 4,171,536 10/1979 Heuer et al. .................. 364/200
4,651,275 3/1987 McDonough .................. 364/200

Primary Examiner—Gareth D. Shaw
Assistant Examiner—Christina M. Eakman
Attorney, Agent, or Firm—Antonelli, Tery, Stout & Kraus

[57] ABSTRACT

In a single chip processor which can be provided with an extended program memory, a high-speed access can be executed without being restricted by the access time for the external program memory when an internal program memory is employed, by varying the effective instruction cycle, and thus a high-speed processing performance for a single chip processor of a stored program type can be attained.

10 Claims, 6 Drawing Sheets

SINGLE CHIP PROCESSOR

BACKGROUND OF THE INVENTION

The present invention relates to a single chip processor, and in particular it relates to a single chip processor having a variable instruction cycle.

There have been many single chip processors which have a memory area storing a program inside a chip of a single processor while being designed to enable the expansion of a program area to the outside of the chip so as to prepare for deficiency of the capacity of an internal memory This consturction is adopted because a memory capacity can not be incorporated in the chip sufficiently for expected applications due to such factors as chip size, consumed power, etc. and it is unavoidable to rely on an external memory in order to secure a capacity sufficient for said expected applications.

In almost all of such single chip processors having a program memory also outside the chip, the same access time is taken in the case when a memory incorporated in the chip is employed as in the case when an external memory is employed.

In a Digital Signal Processor TMS32020 manufactured by Texas Instrument Corporation, for instance, access is made at a slower speed by using a control signal from a pin when an external program memory is employed than when an incorporated memory is employed Even in this case, however, the access time of the incorporated memory is in accord with the access time of the highest speed of an external memory.

As stated above, the time for access to the incorporated memory is the same with the time for access to the external memory in the conventional single chip processors having external memory. In these conventional single chip processors, consequently, an instruction cycle is limited by the operating speed of the external memory, and therefore an improvement in the performance in regard to processing speed can not be attained. This is because the same instruction cycle is given to operations for which the incorporated memory is employed, although this memory is capable of operating the chip at a much higher speed than in the case when the chip is operated according to an instruction inputted from the external memory.

SUMMARY OF THE INVENTION

Regarding the single chip processor provided with a memory outside a chip as well, the present invention is aimed to furnish a single chip processor which enables the attainment of a high-speed access when an incorporated memory is employed, without being restricted by the access time of an external memory In order to achieve the above-stated object, the single chip processor of the present invention is provided with an internal memory incorporated in a chip, an external memory to be coupled to the chip, and means to determine in which of said two program memories of the internal memory and the external memory an address generated for an access thereto is present. Moreover, this single chip processor has means to vary an effective instruction cycle therein in accordance with the result of determination by said determining means.

This constitution enables the attainment of a high-speed access by giving a short instruction cycle when the internal memory is employed, irrespective of the presence of the external memory. When the external memory is employed, on the other hand, the cycle can be prolonged automatically to an appropriate effective instruction cycle or an effective instruction execution start timing of a processing circuit.

DETAILED DESCRIPTION OF THE PREFERRED EMBODIMENTS

Embodiments of the present invention will be described in detail hereunder by using the drawings Herein, (1) a method of changing the frequency of an operation clock over to an integral multiple and (2) a method of changing the period of an address output generated by a program counter over to an integral multiple are described as concrete examples of the aforesaid means to vary an instruction cycle. In the embodiments to be described in the following, in addition, the aforesaid internal and external memories are assumed to be program memories storing instructions for processing.

Embodiment 1

The present embodiment is so designed that an instruction cycle is varied by changing the frequency of an operation clock over to an internal multiple. By means of a frequency-dividing circuit, clock signal of two different of frequencies for an access to an incorporated program memory and an access to an external program memory are generated from the frequency of a basic clock signal, and based on the result of determination by the previously-mentioned determining means, these clock signal of two different frequencies are changed over to be used for the program memories, respectively.

Figure 1:
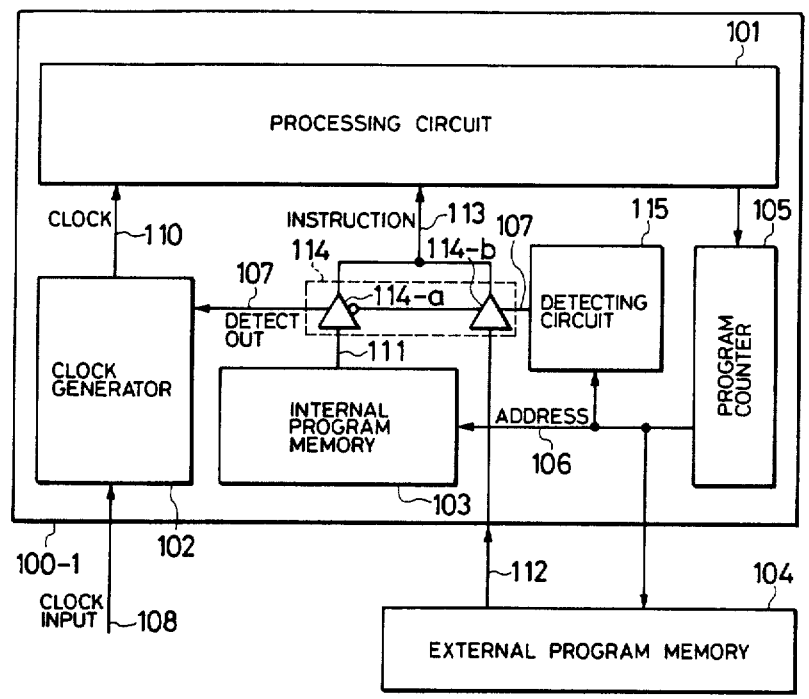
FIG. 1 is an illustration of a construction of a single chip processor of Embodiment 1 of the present invention.

FIG. 1 is a block diagram of a signal processor exemplifying a first embodiment of the present invention. Inside the signal processor 100-1, a processing circuit 101 for executing an arithmetic processing, a clock generator 102 receiving a clock input 108 from the outside and generating a clock signal 110 for the processing circuit, an internal program memory 103 storing an internal program, a program counter 105 generating addresses of programs, detecting means 115 determining whether an address 106 outputted from the program counter 105 is present in the internal program memory 103 or in the external program memory 104, and switching means 114 switching over selectively instructions from the program memories, are provided. Moreover, the external program memory 104 is connected to the signal processor 100-1 externally. A detect out signal 107 is an output signal of the detecting means 115, an instruction 113 is an instruction inputted selectively from the internal memory 103 or the external memory 104 to the processing circuit 101 by way of the switching means 114, and the address 106 is an address signal generated in the program counter 105. The external program memory 104 receives as an input the address 106 outputted by the program counter 105 and delivers a prescribed program step, i.e. an instruction 112. The internal program memory 103 also receives as an input the address 106 outputted by the program counter 105 and delivers a prescribed instruction 111.

Figure 2A:
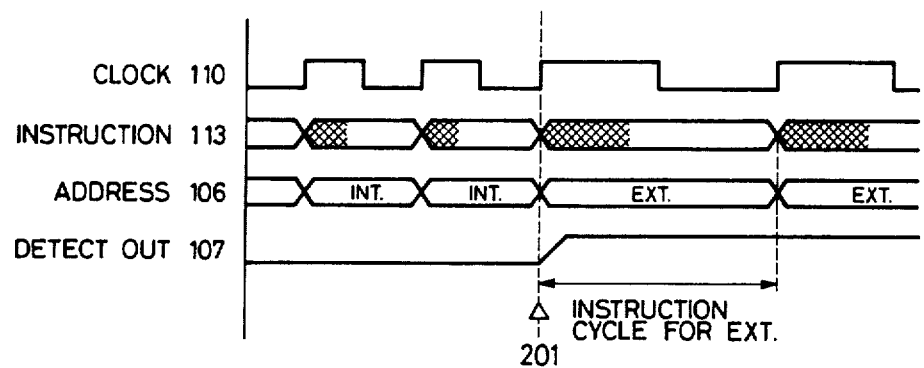
FIG. 2. (A) and (B) are operation timing charts in the cases when an internal memory and an external memory in Embodiment 1 are switched over.
Figure 2B:
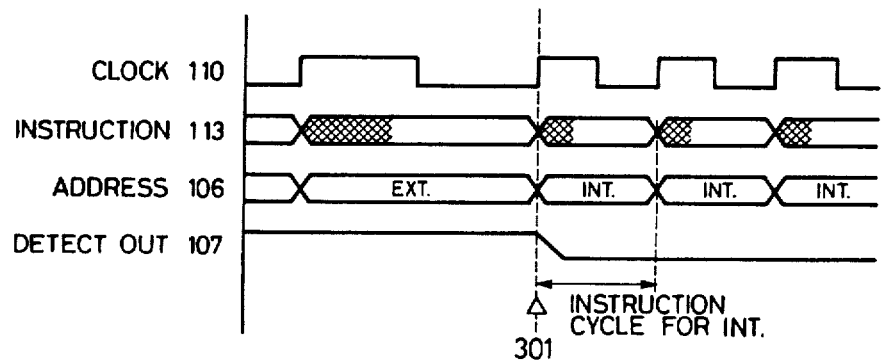

FIG. 2 (A) and (B) are operation timing charts in the cases when the internal memory and the external memory in FIG. 1 are switched over, respectively. FIG. 2 (A) shows the case when switching is made from the internal program memory over to the external program memory at a time point 201, while FIG. 2 (B) shows the case when switching is made from the external program memory over to the internal program memory at a time point 301.

First, a description will be made on the case of FIG. 2 (A). When an operation is conducted by the internal program memory 103, the instruction (program step) 111 is read out of the internal program memory 103 in synchronization with a clock 110 generated in the clock generator 102, and this instruction is delivered as the instruction 113 to the processing circuit 101 through the switching means 114. At this time, the address output 106 from the program counter 105 specifies the internal program memory, and so the detecting means 115 causes output 107 to the clock generator 102 and the switching means 114 to be at a low level. This address output 106 changes to specify the external program memory 104 from the time point 201 in FIG. 2 (A). Based on this specification, the detecting means 115 causes the output 107 to the clock generator 102 and the switching means 114 to be at a high level.

At this time, the instruction 113 delivered to the processing circuit 101 is switched over from the instruction 111 outputted from the internal program memory 103 theretofore to the instruction 112 outputted from the external program memory 104. By the turn of the output signal 107 of the detecting means 115 from a low level to a high level, in other words, a gate of switching means 114-a located in a passage of the instruction 111 is closed, and a gate of switching means 114-b located in a passage of the instruction 112 is opened. At the same time, the output signal (detect gut) 107 of the detecting means controls the clock signal generator 102 as well, so as to change a clock signal 110 to have a frequency fitted for the access to the external program memory 104. In the case of FIG. 2 (A), the frequency of a clock signal is changed to ½. At the time of the access to the external program memory, a longer time is required for generation of an address signal, access to the memory and transmission of a memory content to the processing circuit than at the time of the access to the internal program memory, and the memory content to be executed is not definite in the meantime in the processing circuit. By changing the clock signal frequency to ½ as described above and thereby doubling the time for execution of the instruction in the processing circuit, on the occasion, a processing operation can be conducted sufficiently within the time doubled as stated above even when the execution of the instruction is started after a signal transmitted to the processing circuit becomes definite. In other words, a series of operations described above delay consequently a timing of start of execution of an effective instruction by the processing circuit Contrary to FIG. 2 (A), FIG. 2 (B) shows the state wherein the employment of the external program memory 104 is switched over to that of the internal program memory 103 at the time point 301

Besides, a period indicated by a mark ←—→ in FIG. 2 (A) and (B) is an instruction cycle. This instruction cycle comprises (1) a time required for generation of an address signal at the outset, access to the memory, transmission to the processing circuit and operations of fetch and decode in the processing circuit (a cross-hatched portion of INSTRUCTION 113 in FIG. 2), and (2) a time when an instruction is executed actually in the processing circuit (a blank portion of INSTRUCTION 113 in FIG. 2).

As for a method of realizing the detecting means 115 concretely, an output of the program counter 105 is set to be 16 bits, a capacity of the internal program memory 103 to be 1K words, and a capacity of the external program memory 104 to be 63K words, for instance. If addresses 0 to 1023 are allotted to the internal program memory 103 and addresses 1024 and after to the external program memory 104, a circuit generating the output signal 107, which changes to a high level when a given address specifies the external program memory, can be constructed, by taking the logical sum of the upper 6 bits of the address output 106 of the program counter 105.

Figure 6:
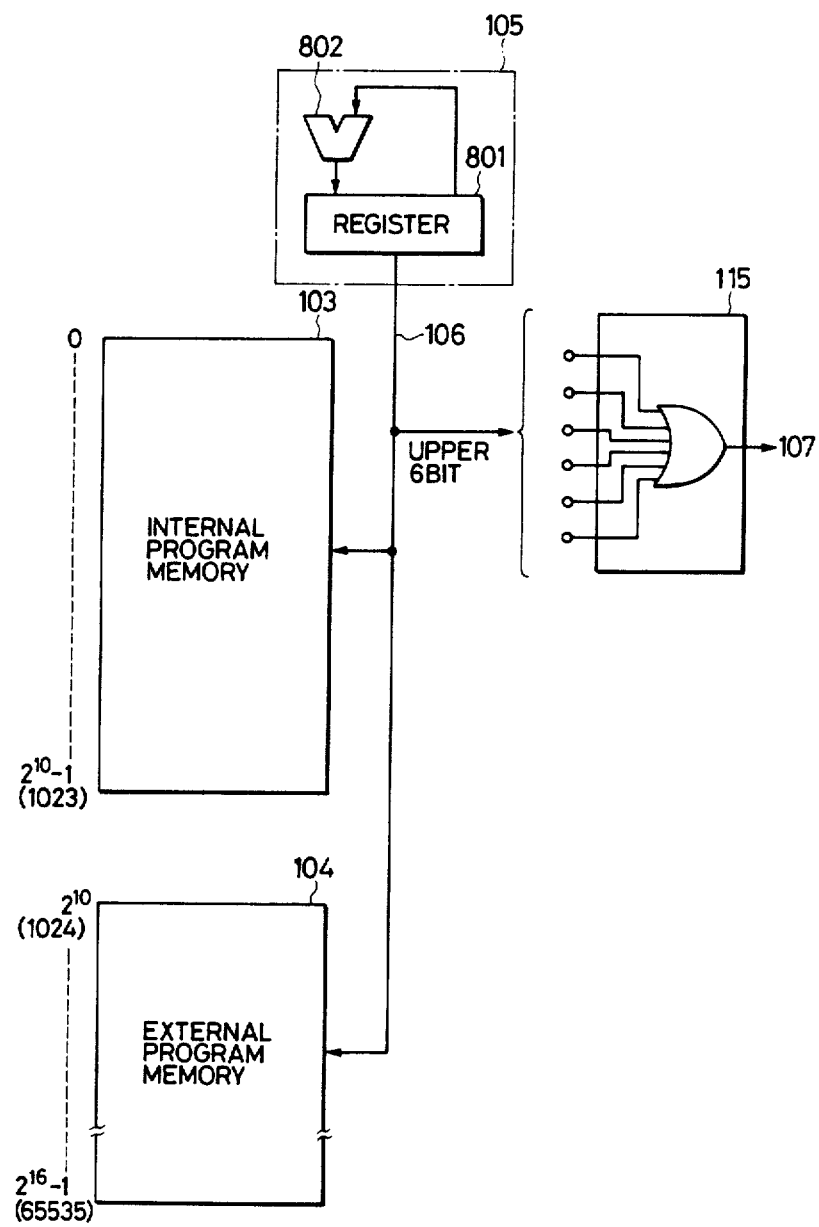
FIG. 6 is an illustration of details of a principal part of the single chip processor of FIG. 1.

FIG. 6 is an illustration of a construction exemplifying the program counter 105 and the detecting means 115 of FIG. 1. The program counter 105 is composed of a register 801 setting an address value and an adder 802 adding +1to said value, and outputs addresses 0 to $(2^{16}-1)$(0 to 65535) set in the register 801, as a counter output 106, to the internal program memory 103 and the external program memory 104. A memory area of addresses 0 to $(2^{10}-1)$(addresses 0 to 1023) is allotted to the internal program memory 103, and a memory area of addresses $2^{10}$ to $(2^{16}-1)$ (addresses 1024 to 65535) to the external program memory 104. Digits of $2^{10}$ to $(2^{16}-1)$ of an address value of this counter output 106, i.e. the upper 6 bits alone, are inputted to the detecting means 115. The detecting means 115 takes the logical sum of each of the upper 6 bits of the address value and generates the output signal 107 thereof. Since the storage area of the internal program memory 103 is 0 to $(2^{10}-1)$ and that of the external memory 104 is $2^{10}$ to $(2^{16}-1)$, in other words, the output 107 is at a high level "1" when any one of the upper 6 bits is at the high level "1", and this shows that the output is the address of the external program memory 104. When all of the upper 6 bits are at a low level "0", on the other hand, the output 107 is at the low level "0", and this shows that the output is the address of the internal program memory 103.

Figure 3:
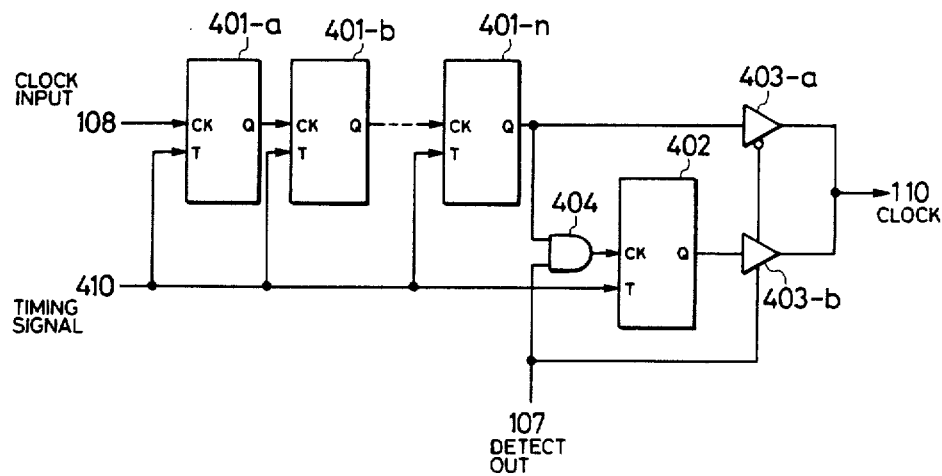
FIG. 3 is an illustration of a construction of a clock generator of FIG. 1.

FIG. 3 is an illustration of a construction exemplifying the clock signal generator of FIG. 1. A circuit generating a clock signal 110 can be realized by a circuit formed by connecting in series a plurality of T-type flip-flops 401 as shown in FIG. 3. When the external memory 104 is employed, a clock frequency half of the one for employment of the internal memory 103 is outputted therefrom. Concretely, an input signal 108 from the outside is inputted to the clock terminal of a flip-flop 401-a in a first stage synchronously with a timing signal 410 which is at the high level ("1") constantly, and the signal is inputted to flip-flops in second, third and subsequent stages sequentially and thus frequency-divided by the flip-flops 401. After a prescribed clock frequency for the access to the internal program memory 103 is obtained by frequency division, a gate 403-a is opened to deliver the clock signal 110 when the detect out signal 107 of the detecting means 115 is at the low level. When the detect out signal 107 of the detecting means 115 is at the high level, on the other hand, an AND gate 404 is opened to set an additional flip-flop 402. The frequency is thereby divided further into halves, and thus the clock signal 110 having a period twice as long as the one of the previous signal is outputted through a gate 403-b.

In the present embodiment, as described above, an effective instruction cycle is varied by changing over the clock signal frequency generated in the clock generator 102, and thereby the timing of start of execution of an effective instruction by the processing circuit can be delayed in the signal processor having the external program memory. Accordingly, it is possible to give a short instruction cycle when the access is made to the internal program memory having a high operation speed, and to give a long instruction cycle when the access is made to the external program memory, and thus the function of the internal program memory capable of operating at a high speed can be used sufficiently.

In the present embodiment, an original clock 108 serving as the base of the clock signal 110 is supplied from the outside of the signal processor 100-1. In this relation, an oscillator may be incorporated inside the aforesaid signal processor 100-1 (e.g. inside the clock signal generator 102), or an oscillating circuit may be incorporated in the signal processor 100-1 with a crystal alone provided outside it. This is applicable to other embodiments as well.

Embodiment 2

The present embodiment is so designed that a machine cycle in the processing circuit is not varied also for the access to the external program memory with the frequency of a clock signal fixed, but the period of an address output generated by the program counter is varied. After execution of one instruction, in this embodiment, the processing circuit is controlled to be in a state of No-Operation until the program counter is made to operate for execution of the next instruction.

Figure 4:
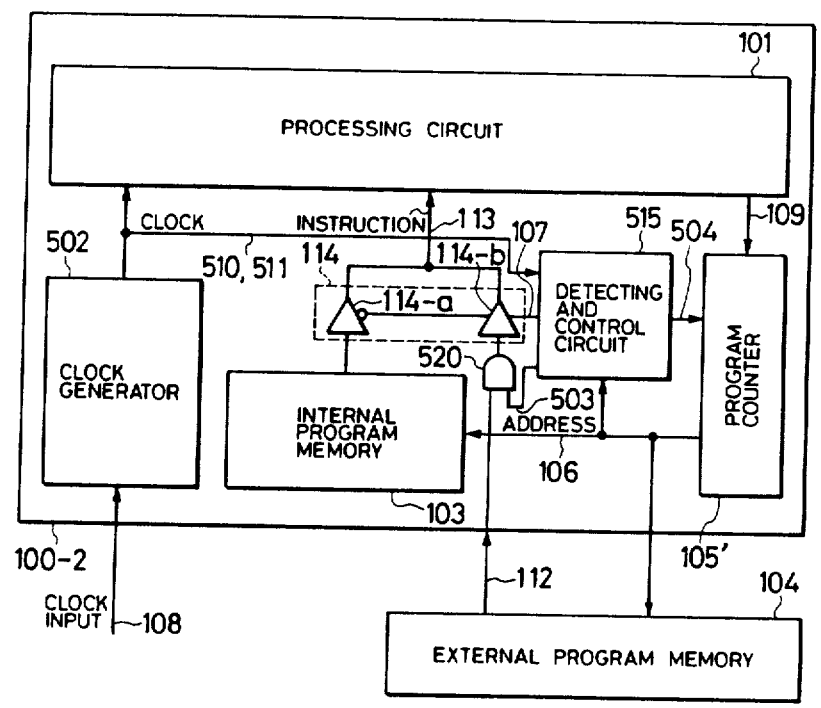
FIG. 4 is an illustration of a construction of a single chip processor of Embodiment 2 of the present invention.
Figure 5A:
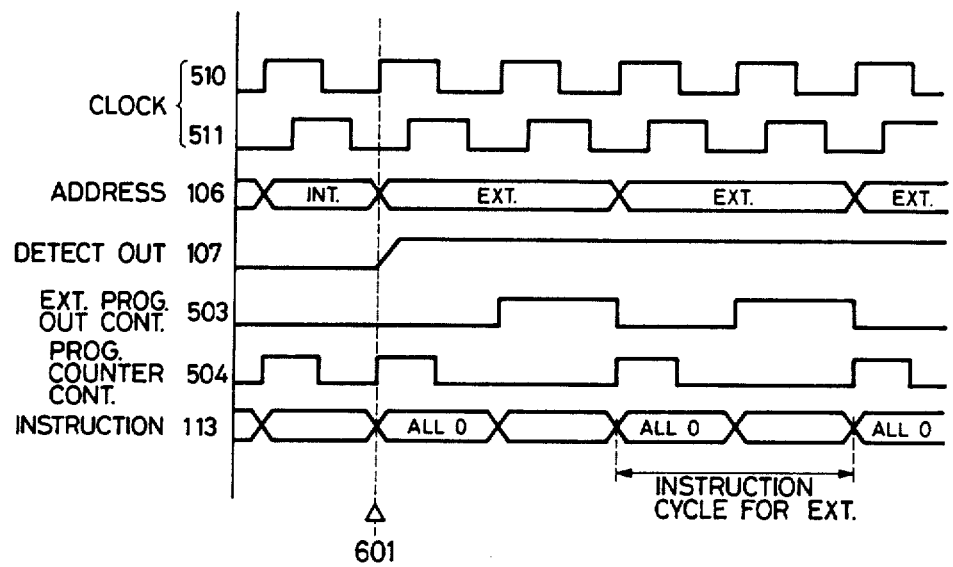
FIG. 5 (A) and (B) are operation timing charts in the cases when an internal memory and an external memory in Embodiment 2 are switched over.
Figure 5B:
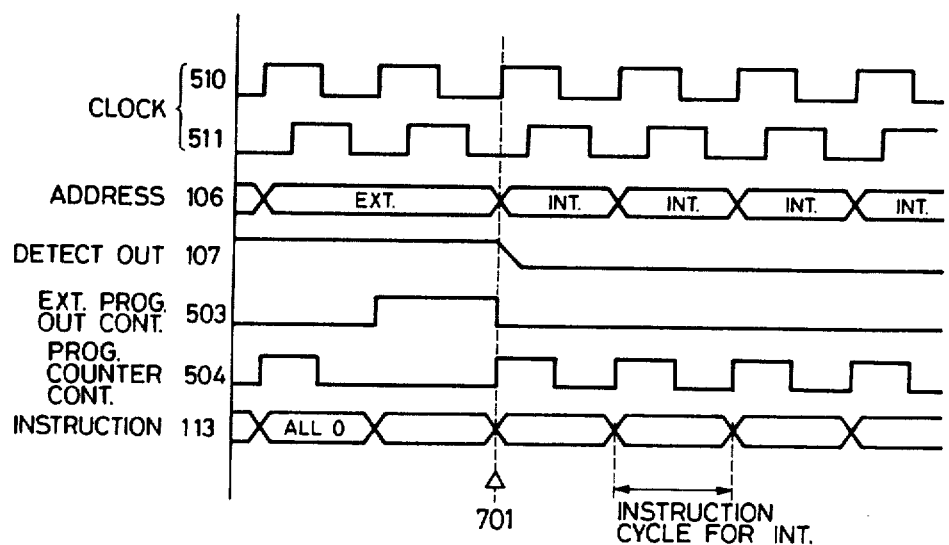

FIG. 4 is a block diagram of a signal processor 100-2 exemplifying a second embodiment of the present invention, and FIG. 5 (A) and (B) are operation timing charts in the cases when the internal program memory and the external program memory in FIG. 4 are switched over, respectively. In this embodiment, clock signals 510 and 511 of two phases are used as internal clock signals as shown in FIG. 5 (A) and (B).

In FIG. 4, a detecting and control circuit 515 receives an output address 106 of a program counter 105 and the clock signals 510 and 511 of two phases as inputs and delivers a detect out signal 107 for switching over the internal program memory 103 and the external program memory 104, while outputting a program counter control signal 504 for controlling the program counter 105' and further outputting an external program output control signal 503 for controlling the input of an instruction code from the external program memory 104. Components other than the above are the same with those of Embodiment 1 of FIG. 1.

FIG. 5 (A) shows the state of operation at the time when switching is made from the internal program memory 103 to the external program memory 104 at a time point 601. FIG. 5 (B) shows the state of operation at the time when switching is made from the external program memory 104 to the internal program memory 103 at a time point 701.

In the embodiment of FIG. 4, clock signals 510 and 511 are not varied either in the case when the internal program memory 103 is employed or in the case when the external program memory 104 is employed In the case when the external memory 104 is accessed, instead, a control is made by the program counter control signal 504 of the control circuit 515 so that the program counter 105' may operate only once in two cycles. The processing circuit 101 is so designed that a program code of all "0" is executed once in two cycles when the external program memory 104 is employed, although the circuit operates in every cycle irrespective of the cases of employment of the internal program memory 103 and of the external program memory 104 (see 113 of FIG. 5 (A) and (B)). By defining the instruction code of all "0" as No-Operation, the processing circuit is held in the state of No-Operation once in two cycles. As shown in FIG. 5, the aforesaid program code of all "0" is executed in the preceding cycle in the execution of instruction of two cycles for the same address. This is because a memory content to be executed is not definite in the processing circuit during a time required from generation of an address signal to transmission of the memory content to the processing circuit, as is described previously in regard to FIG. 2. Accordingly, the execution of the instruction of all "0" is conducted in the preceding cycle before the memory content becomes definite, while the primary execution based on the memory content is conducted in the cycle after the content becomes definite. A series of operations described above also delays, in consequence, the timing of start of execution of an effective instruction by the processing circuit, as in the Embodiment 1. Besides, in the present embodiment, in the same way as in Embodiment 1, it is assumed that addresses 0 to $(2^{10} - 1)$ are allotted to the internal program memory 103 and addresses $2^{10}$ to $(2^{16}-1)$ to the external program memory 104.

Figure 7:
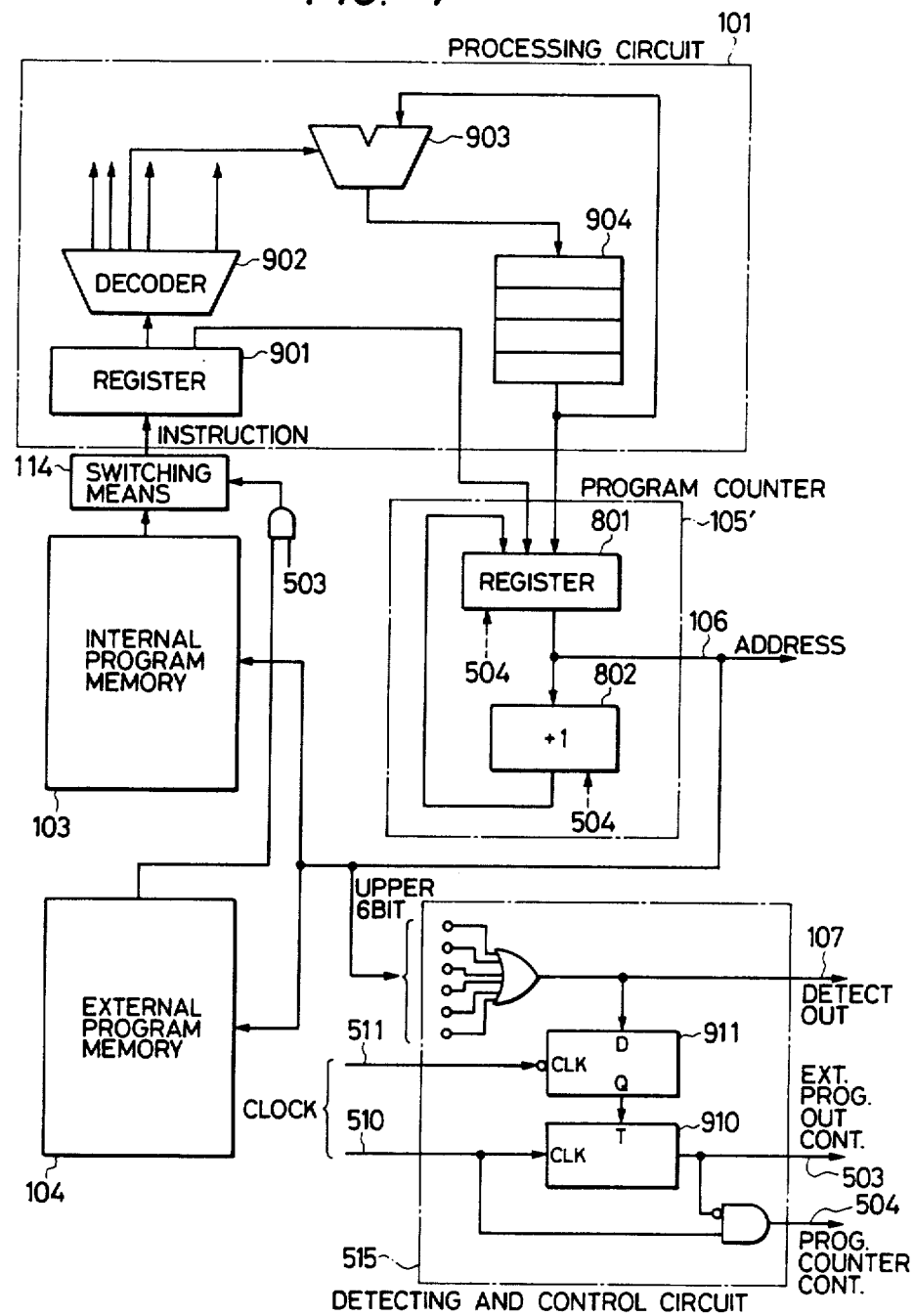
FIG. 7 is an illustration of the details of a principal part of the single chip processor of FIG. 4.

FIG. 7 is an illustration of details of a principal part of FIG. 4.

In the processing circuit 101, an adder-subtracter 903 executing numerical and logical operations, a register 901 storing a program code read out of each memory, a decoder 902 decoding the content of the register 901, a general purpose register 904 storing the results of operations as well as the input data of a processor, etc. are incorporated. The program counter 105' comprises a register 801 storing an address value, a +1 processor 802, etc., and the register 801 receives as inputs a part of the content of a data register 901, a part of the content of the general purpose register 904 and an output from the +1 processor 802 respectively, and delivers them as address outputs 106 to the internal program memory 103, the external program memory 104 and the control circuit 515. The control circuit 515, like the detecting circuit 115 of FIG. 6, receives the upper 6 bits of an address value as an input, takes the logical sum of each of these bits, and, based thereon, delivers, as a control signal 107, a signal of high level if "1" is contained in any of the sum, and a signal of low level if all are "0", to a switch 114 provided in a passage of reading from the internal program memory 103 and the external program memory 104. An external program output control signal 503 can be obtained from a Q output of a T-type flip-flop 910 by delaying the control signal 107 till a falling period of a clock 511 by means of a D-type flip-flop 911, and by delivering the delayed signal to a T input of the flip-flop 910 while inputting a clock signal 510 to a CLK input. This signal is delivered to an AND gate 520 provided in the passage of reading from the external program memory 104 A program counter control signal 504 can be obtained by taking an inverted signal of a Q output of the flip-flop 910 and a logical product of the clock signal 510, and it is delivered to the program counter 105. In the case when the external program memory 104 is employed, the program counter 105' is controlled by the program counter control output 504 so that it operates only once in two cycles. In other words, it operates in the following way, if described on the basis of FIG. 5 (A) and (B). When the internal program memory is employed, the period of the clock 510 (or 511) and that of the program counter control signal 504 are in accord with each other, and the program counter operates in every period of the clock signal to execute an instruction. When the external program memory is employed, on the other hand, the period of the program counter control signal 504 becomes twice as long as that of the clock signal 510 (or 511), and the program counter operates in every two cycles of the clock signal. On the occasion, the machine cycle in the processing circuit is set to be the same as that in employment of the internal program memory, and the circuit is made to execute the instruction of all "0" until a subsequent instruction is fetched after one instruction is executed.

In the present embodiment, as described above, the machine cycle in the processing circuit is not varied for the access to the external program memory, but the period of the address output generated by the program counter is varied, with the frequency of the clock signal fixed. Besides, the control is provided so that the processing circuit is put in the state of No-Operation until the program counter is caused to execute a subsequent instruction after one instruction is executed. This constitution makes it possible to vary the instruction cycle in accordance with an access time for each of the internal program memory and the external program memory, and thus to delay the timing of start of execution of an effective instruction by the processing circuit.

We claim:

1. A single chip processor to be coupled to an external program memory which stores instructions, comprising:
   (a) a processing circuit;
   (b) an internal program memory for storing instructions;
   (c) a program counter for generating addresses for an access to said external program memory and said internal program memory in response to a signal from said processing circuit;
   (d) detecting means for determining whether an address generated by said program counter is an address for reading an instruction from said external program memory or an address for reading an instruction from said internal program memory; and
   (e) means for varying the instruction cycle time of said single chip processor in accordance with the result of the determination by said detecting means.

2. A single chip processor according to claim 1, wherein said means for varying the instruction cycle time of the single chip processor is a clock signal generator having means for changing the output frequency thereof in accordance with the result of determination by said detecting means.

3. A single chip processor according to claim 1, wherein said means for varying the instruction cycle time of the single chip processor comprises means for changing the period of address generation by said program counter in accordance with the result of determination by said detecting means, and means for holding said processing circuit in a state of no operation during a prescribed time in one period of said address output.

4. A single chip processor according to claim 1, further comprising
   switching means for switching over selectively an output of said external program memory and an output of said internal program memory in accordance with the result of determination by said detecting means.

5. A single chip processor according to claim 1, wherein said external program memory is a memory of a low-speed operation type while said internal program memory is a memory of a high-speed operation type.

6. A single chip processor to be coupled to an external program memory which stores instructions, comprising:
   (a) a processing circuit;
   (b) an internal program memory for storing instructions;
   (c) a program counter for generating addresses for an access to said external program memory and said internal program memory in response to a signal from said processing circuit;
   (d) detecting means for determining whether an address generated by said program counter is an address for reading an instruction from said external program memory or an address for reading an instruction from said internal program memory; and
   (e) means for controlling the timing of start of execution of an instruction by said processing circuit in accordance with the result of determination by said detecting means.

7. A single chip processor according to claim 6, wherein said means for controlling the timing of start of execution of an instruction by said processing circuit is a clock generator having means for changing the output frequency thereof in accordance with the result of determination by said detecting means.

8. A single chip processor according to claim 6, wherein said means for controlling the timing of start of execution of an instruction by the processing circuit comprises means for changing the period of address generating by said detecting means, and means for holding said processing circuit in a state of no operation during a prescribed time in one period of said address output.

9. A single chip processor according to claim 6 further comprising
   switching means for switching over selectively an output of said external program memory and an output of said internal program memory in accordance with the result of determination by said detecting means.

10. A single chip processor according to claim 6, wherein said external program memory is a memory of a low-speed operation type, while said internal program memory is a memory of a high-speed operation type.

* * * * *